(12) United States Patent
Chen et al.

(10) Patent No.: US 6,321,778 B1
(45) Date of Patent: Nov. 27, 2001

(54) APPARATUS FOR PIPELINE CONSTRUCTION

(75) Inventors: Jisheng Chen; Mingyi Li, both of Panjin (CN)

(73) Assignee: China Liaohe Oilfield Huasheng Pipeline Research Institute, Liaoning Province (CN)

( * ) Notice: Subject to any disclaimer, the term of this patent is extended or adjusted under 35 U.S.C. 154(b) by 0 days.

(21) Appl. No.: 09/070,148

(22) Filed: Apr. 30, 1998

(30) Foreign Application Priority Data

Apr. 30, 1997 (CN) .............................. 97214346 U

(51) Int. Cl.[7] ................................................ F16K 43/00
(52) U.S. Cl. ...................... 137/318; 138/94; 408/99; 408/102; 408/126
(58) Field of Search ................... 137/15.14, 318; 138/94, 94.3, 97; 408/67, 99, 97, 124, 102

(56) References Cited

U.S. PATENT DOCUMENTS

| | | | |
|---|---|---|---|
| 419,974 | * 1/1890 | Smith | 137/318 |
| 527,877 | * 10/1894 | O'Neil | 137/318 |
| 563,488 | * 7/1896 | Howe | 137/318 |
| 592,007 | * 10/1897 | Howe | 137/318 |
| 600,831 | * 3/1898 | Howe | 137/318 |
| 845,830 | * 3/1907 | Van Winkle | 137/318 |
| 1,956,129 | * 4/1934 | Mueller et al. | 137/318 |
| 2,272,734 | * 2/1942 | Witt | 138/94 |
| 2,285,779 | * 6/1942 | Mueller et al. | 138/94 |
| 2,425,483 | * 8/1947 | Mueller et al. | 138/94 |
| 3,120,246 | * 2/1964 | Alter | 138/94 |
| 3,155,369 | * 11/1964 | Wright et al. | 138/94 |
| 3,543,802 | * 12/1970 | Leopold, Jr. et al. | 138/94 |
| 3,948,282 | * 4/1976 | Yano | 137/318 |
| 4,127,141 | * 11/1978 | Ledonne et al. | 137/318 |
| 4,285,368 | * 8/1981 | Terrill et al. | 138/94 |
| 5,676,171 | * 10/1997 | Heed | 138/94 |

\* cited by examiner

Primary Examiner—George L. Walton
(74) Attorney, Agent, or Firm—Lowe Hauptman Gilman & Berner, LLP; Gilman & Berner, LLP

(57) ABSTRACT

An apparatus for pipeline construction comprises a constructing means located on the lower part of the apparatus, which includes a chest and a unit for completing the operation of construction; a feeding means located on the upper part of the apparatus, which drives the constructing means to rotate and to approach to the constructed pipe, and which includes a main shaft having a central hole, a rod placed in the central hole, a drive means as well as a rod feeding means; a base of the apparatus, the bottom of the base and the top face of the base are detachably connected with the feeding means and the constructing means respectively.

22 Claims, 3 Drawing Sheets

APPARATUS FOR PIPELINE CONSTRUCTION

FIELD OF THE INVENTION

The present invention relates to an apparatus for pipeline construction, and more particularly to an apparatus for pipeline construction in the petroleum industry, chemical industry, water supply and drainage engineering etc., which can perform, without stopping fluid delivery in the pipeline, the operations of drilling, plugging and collision-mat feeding during such the construction processes as remodeling flow circuit, connecting a new pipe with a used one or replacing pipes.

BACKGROUND OF THE INVENTION

At present, under the condition on that the fluid delivery, particularly the pressurized fluid delivery in the pipe is not interrupted, the construction of pipeline generally include the operations of drilling, plugging and collision-mat feeding. In general practice, there are three apparatus used for the operations. A drilling apparatus is used to make opening on the wall of the operated pipe, a plugging apparatus is then used for plugging the pipe, and a collision-mat feeding apparatus is finally used for placing a permanent collision-mat in the opening of the pipe. Thus, the three separate apparatus are needed for the construction operations of the pipeline. Therefore, a number of problems, such as the repair and maintenance of the apparatus, as well as transport of the apparatus are resulted from so many apparatus used. Besides, in order to form by-pass path for fluid delivery during the constructions, additional opening has to be made in the upper and lower reaches of the constructed pipe, therefore the additional work is done and additional damage of pipe is caused.

OBJECTIVES OF THE INVENTION

In view of the above mentioned prior art, one of the objectives of this invention is to provide an apparatus which has the functions that three prior art apparatus, an drilling apparatus, a plugging apparatus and a collision-mat feeding apparatus, can perform.

Another objective of this invention is to provide an apparatus, when it is used for construction operations, no additional by-pass holes on the pipe is needed.

Still another objective of this invention is to provide an apparatus, which is shorter and lighter in comparison with the prior art apparatus. Therefore, it can be used in the workshop and it is easy to move.

SUMMARY OF THIS INVENTION

The present invention provides an apparatus for pipeline construction,, which comprises a constructing means, a feeding means and a base. Said constructing means is located on the lower part of the apparatus, which includes a chest and a constructing unit in the chest for completing operations. Said feeding means is located on the upper part of the apparatus and may drive the constructing means to rotate and approach towards the operated pipe. Said feeding means includes a main shaft, a rod, a driving means and a rod feeding mechanism. Said main shaft having a central hole extends through whole feeding means so as to drive said constructing means. Said rod is provided within the central hole of the main shaft and is capable of selectively moving with respect to the main shaft so as to drive the constructing means to move vertically. Said driving means transmits power to said main shaft and drives the main shaft to rotate and to move vertically. And said rod feeding mechanism drives the rod to move vertically. The apparatus according to the present invention further comprises a base, the bottom of the base is detachably connected with said constructing means and the top face of the base is detachably connected to said feeding means.

Further objectives and advantages of the invention will appear from the following description and the accompanying drawings.

BRIEF DESCRIPTION OF THE ACCOMPANYING DRAWINGS

In all drawings, same reference number designates same part of the apparatus of this invention.

DETAILED DESCRIPTION OF THE PREFERRED EMBODIMENTS

Figure 1:
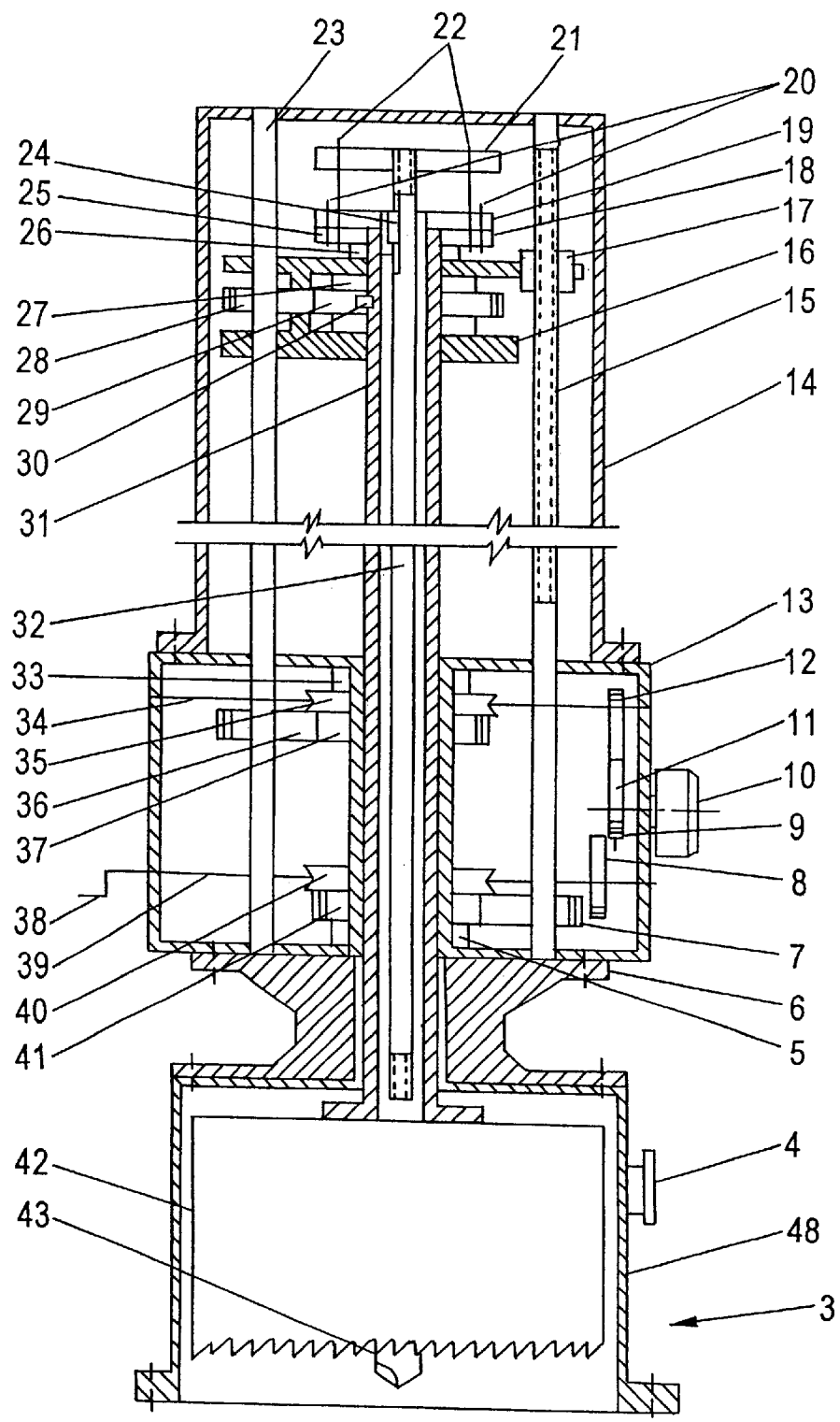
FIG. 1 is a cross sectional view showing an apparatus with a drilling unit according to the present invention.
Figure 2:
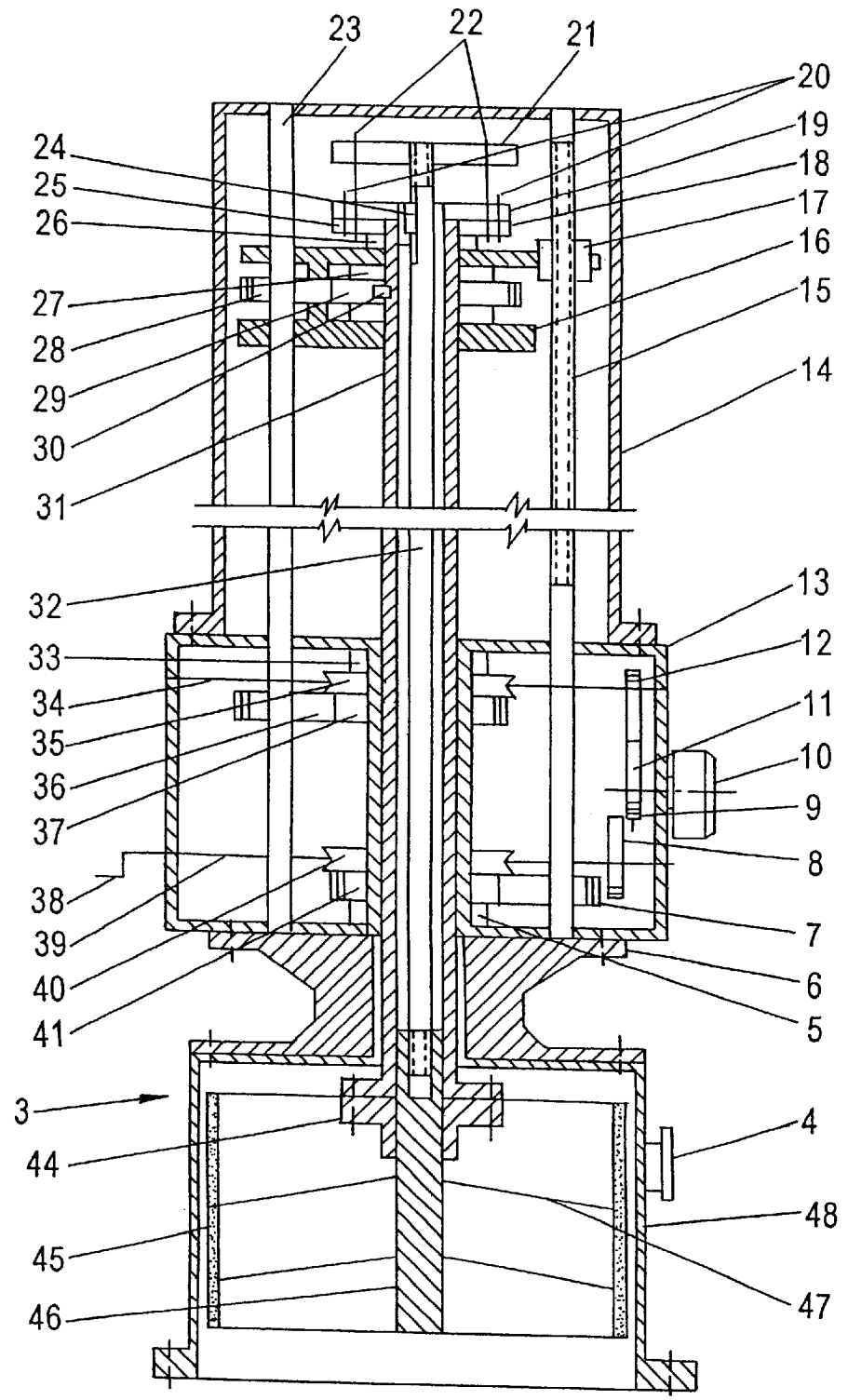
FIG. 2 is a cross sectional view similar to FIG. 1 showing the apparatus with a plugging unit according to the present invention.
Figure 3:
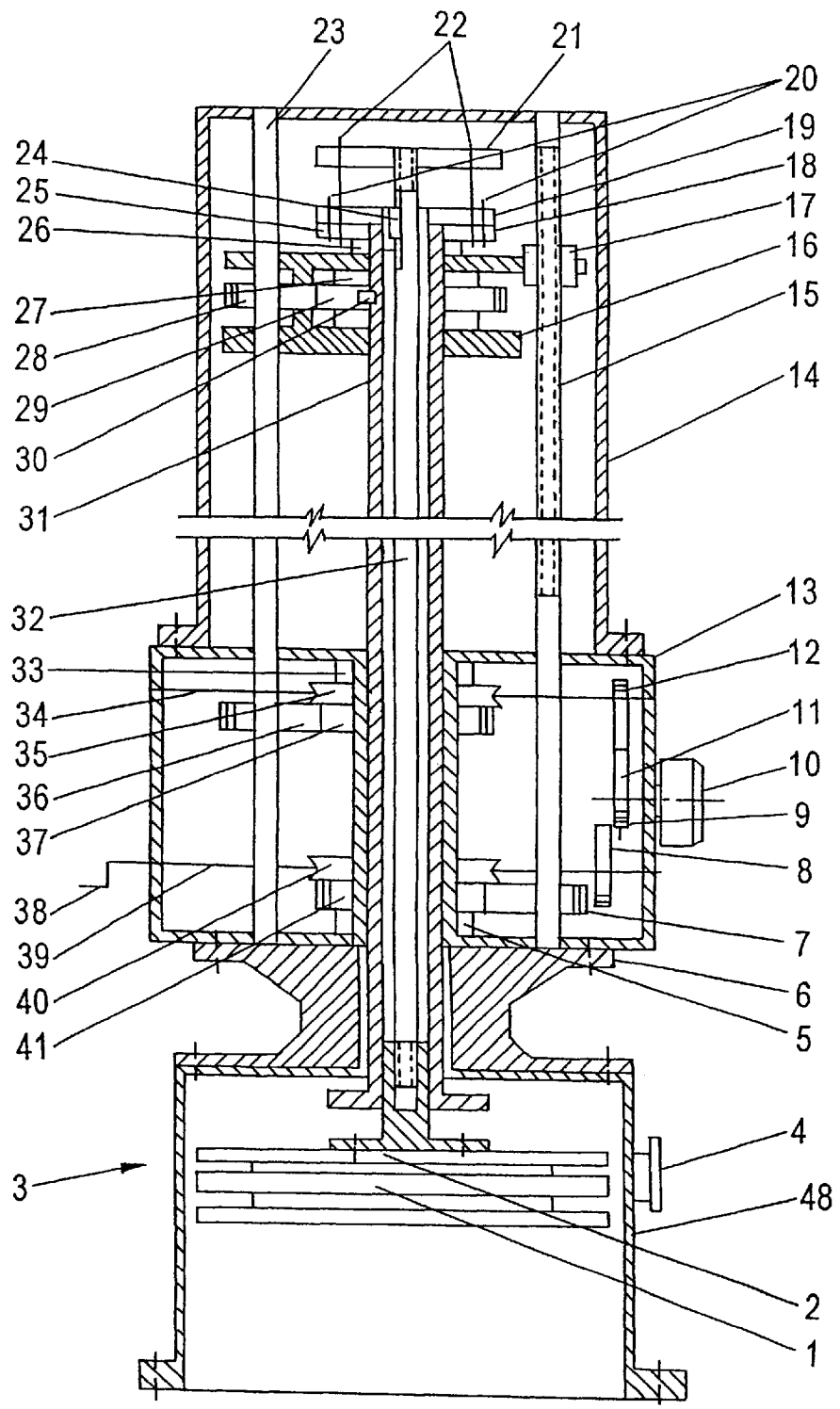
FIG. 3 is a cross sectional view similar to FIG. 1 showing the apparatus with a collision-mat feeding unit according to the present invention.

FIG. 1, FIG. 2 and FIG. 3 illustrate the apparatus according to this invention, which includes a constructing means 3 located on the lower part of the apparatus. The constructing means 3 includes a chest 48 having a by-pass hole connected with outside space of the apparatus. On the upper face of the chest 48, there is an opening 4 which can be closed. The apparatuses shown in all drawings are in the operation condition and under such condition the opening 4 is connected with the by-pass pipe. There is a flange fixed to the bottom of the chest 48, and said flange is used to connect with a four-direction three-way valve (not shown in the drawings) used in the construction process. Said constructing means 3 also includes constructing unit, which can be changed from one to another depending upon the need of the operation. Said constructing unit may include a drilling unit for completing end opening, a plugging unit for completing plugging and a collision-mat feeding unit for completing collision-mat feeding. Said units may be respectively fixed to the feeding means 16 according to the operational sequence set forth below, and may be put in the chest 48 by main shaft 31.

As shown in FIG. 1, in said constructing means 3 the unit used for completing the operation of opening comprises a barrel cutter 42 connected fixedly to said main shaft 31 and a central drill 43 connected fixedly to said barrel cutter 42.

As shown in FIG. 2, in said constructing means 3 the unit used for completing the operation of plugging is a plugging means. The plugging means comprises a connecting tray 44 which is fixed to main shaft 31 and has a central hole aligned with the central hole of said main shaft 31; a plugger 45 which is a peripherally unclosed cylinder with its wall made of heat resistant, pressure resistant and oil resistant soft metal, and it's the unclosed peripheral portion of the cylinder is directed to the upper reach of the constructed pipe when said plugger 45 is put in said chest 48; a plugging shaft 46 which can relatively move through the central hole of said connecting tray 44 and is connected with the lower end of the rod 32 by means of thread; and connecting rods 47, one end of each connecting rod is connected fixedly to said plugging shaft 46, the other end is fitted with said plugger 45, the connecting rod 47 forms an acute angle with axial direction of said plugging shaft 46, by means of this factor, the axial movement of said plugging shaft 46 can form a right angle between said connecting rod 47 and plugging shaft 46, therefore the connecting rod 47 is extended outwardly further, pushing the plugger 45 and spreading it wider, thereby the purpose for plugging the pipe is achieved.

As shown in FIG. 3, in said constructing means 3 the unit used for completing collision-mat feeding comprises a connector 2 which is slidably mounted within said central hole of the main shaft 31 and is fixed to the lowest end of the rod 32 by thread; and a collision-mat 1 is fixed on said connector 2. The functions of these units will be described in detail below.

As shown in FIGS. 1, 2 and 3, the apparatus according to the present invention further comprises a feeding means 16 which is located on the upper part of the apparatus and is used to rotate said constructing means as well as to drive said constructing means to approach towards the constructed pipe. The feeding means 16 includes a main shaft 31 which extends through whole feeding means 16 for carrying said constructing means into feeding and/or rotation, and the main shaft 31 has a central hole; a rod 32 provided within the central hole of the main shaft 31, which can selectively move with respect to the main shaft 31; a driving means 13 which is located on the lower part of whole feeding means 16 and is used for transmitting power to said main shaft 31, so as to drive the main shaft 31 to feed axially and rotate, and a rod feeding mechanism (described in detail below).

The apparatus according to the present invention comprises further a base 6, the bottom of the base 6 is detachably connected with the chest 48 and the top face of the base 6 is detachably connected to said feeding means 16 through the driving means 13.

As shown in FIG. 1, FIG. 2 and FIG. 3, the top face of the base 6 is connected with the driving means 13, two centripetal-force bearings 5 of a hollow shaft 33 bear the axial force from the main shaft 31 and feeding means 16. The bottom of a shell 14 is connected with the driving means 13, and the upper part of the shell 14 supports a drive shaft 23 and a drive shaft 15. The feeding means 16 is slidably connected with the main shaft 31 through two radial-force bearings 27, and through a nut 26, the feeding means 16 is connected as a whole with the main shaft 31. The drive shaft 15 drives the main shaft 31 and the feeding means 16 to move together axially.

The driving means 13 comprises a drive shaft 23, which drive the main shaft 31 to rotate. The transmission of power from the drive shaft 23 to the main shaft 31 is completed by a mechanism. Said mechanism comprises a hydraulic motor 10 having an output shaft, the extension direction of the output shaft forms a right angle with that of said main shaft 31; a gear 11 which is fixed to the output shaft of the hydraulic motor 10 and can rotate along with the output shaft; a control mechanism 9, such as a fork, which is provided on said output shaft; a gear 12 which can be selectively engaged with the gear 11, a hollow shaft 33 which can be fitted over said main shaft 31 and can rotate in respect of the main shaft 31; a worm gear and worm mechanism 35 and 34, wherein the worm 34 is fixed together with the gear 12 to a shaft and can rotate along with the gear 12, said worm gear 35 is fixed to said hollow shaft 33 and can carry the hollow shaft 33 into rotation; a gear 36 which is engaged with the gear 37 and is fixed to a drive shaft 23, and the gear 36 can drive the drive shaft 23 to rotate; a gear 28 which is fixed to the drive shaft 23 and can rotate along with the drive shaft 23; and a gear 29 which is fixed to the main shaft 31 by means of a flat key 30 so as to carry said main shaft 31 into rotation and is engaged with said gear 28 to transmit rotation of said drive shaft 23 to said main shaft 31; said gear 28 which is mounted in such a manner that it can slide along said drive shaft 23 so as to axially move along with the feeding of said main shaft 31, therefore, to keep the engagement with said gear 29 all the time.

The driving means 13 comprises further a drive shaft 15 which is used for transferring power to the main shaft 31 to move the main shaft axially. The power is transmitted from said drive shaft 15 to said main shaft 31 by means of such a mechanism which comprises a gear 8 that can be selectively engaged with the gear 11 by means of the control mechanism 9; a worm-gear and worm mechanism 40 and 39, wherein the worm 39 is fixed together with the gear 8 to same shaft and can rotate along with the gear 8, and said worm gear 40 can be ratably mounted on said hollow shaft 33; a rocker bar 38 which is fixedly connected with the worm 39, the operator can rotate the rocker bar 38 to drive the drive shaft 15 rotated even if the gear 11 is not engaged with the gear 8; a gear 41 which is rotably mounted on the hollow shaft 33 and is rotably fixed together with the worm 40; and a gear 7 which is engaged with the gear 41 and is fixed to said drive shaft 15 to carry said drive shaft 15 into rotation. The portion of said drive shaft 15 located within said feeding means 16 is a threaded section. A nut 17 is fixed to said main shaft 31, when the threaded section of the drive shaft 15 is fitted with said nut 17, the rotation of said drive shaft 15 is then converted to the axial movement of said main shaft 31.

The mechanism for controlling the axial movement of the rod 32 is built in such a manner: the upper part of the rod 32 is threaded, a first nut 21 is fitted with the threaded part of said rod 32 and the rotation of the first nut 21 can drive the rod 32 to move axially towards said chest 48. A mechanism which is used for controlling said rod 32 to rotate along with the main shaft 31 or not to rotate along with the main shaft 31, comprises: a key seat extended along the whole threaded section of said rod 32; a flat key 24 detachably fitted with said key seat; a threaded sleeve 25 fitted with said rod 32 by means of the flat key 24; a second nut 19 fitted over said threaded sleeve 25 by means of thread so as to adjust the location of said second nut 19; a third nut 18 fixedly mounted on the upper end of said main shaft 31 by means of thread, which is used for adjusting the location of the nut 18; and two first threaded rods 20 for fixedly interconnecting said nuts 19 and 18. Said control mechanism can also be used for defining the peripheral location of the rod 32. Two second threaded rods 22 can fixedly interconnect the second nut 19 with said first nut 21.

The cross section of the upper part of said rod 32 is rectangular shaped, which enable the operator manually rotate the rod 32 by using a clamping tool.

The lower end of the main shaft 31 extends through said base 6 into said chest 48.

The operation mode of the apparatus according to the present invention is described as follows.

According to conventional operation mode, a four-direction three-way valve (not shown in drawings) is respectively welded on each of the upper and lower reaches of the constructed pipe for transporting fluid, then two chests 48 are connected to said four-direction three-way valve respectively, and a by-pass path of the constructed pipe is formed by connecting the path with the opening of the chest 48, and in such a manner, the fluid transport in the pipeline is ensured.

Since the operations in the upper and lower reaches are performed at the same time and in the same manner, only the end opening, plugging and collision-mat feeding operations in the upper reaches are described below.

As a first step, opening operation is made. As shown in FIG. 1, the barrel cutter 42 and the central drill 43 are fixed to the flange of the main shaft 31, then the whole feeding means 16 is installed onto the base 6. The barrel cutter 42 and the central drill 43 are placed into the chest 48. After the chest 48 is connected with the base 6, the flange at the bottom of the chest 48 is connected with the four-direction three-way valve to complete the installation for the opening operation.

The gear 11 is engaged with the gear 12 by the control mechanism 9. After the start of the hydraulic motor 10, the rotation of the output shaft of the motor 10 is transferred to the main shaft 31 through the gears 11 and 12, the worm gear-worm 35 and 34, the gears 37 and 36, the drive shaft 23 and the gears 28 and 29, thereby to carry the barrel cutter 42 and the central drill 43 into rotation. Meanwhile, the operator may rotate the rocker bar 38, thus the main shaft 31 is drived to rotate and to move axially through the worm gear-worm 40 and 39, the gears 41 and 7, the drive shaft 15, and the nut 17, thereby the barrel cutter and the central drill are carried into the four-direction three-way valve via the chest 48, to make opening on the constructed pipe.

Although it is not shown in the drawings, it will be understood there are a number of apertures on the barrel cutter in order to ensure the flow in the constructed pipeline. In addition, iron chipper recoverer is also provided. As these are the common knowledge to a person skilled in the art, no further description is given herein.

After the pipe is cut off, the operator controls the rocker bar 38, the main shaft 31 along with the barrel cutter and the central drill are withdrawn back into the chest 48, the four-direction three-way valve is then closed. Due to the existence of the four-direction three-way valve, the fluid in the pipe can flow normally through the four-direction three-way valve without leakage. The feeding means along with the barrel cutter and the central drill is then detached from the chest 48. Afterwards, the barrel cutter and the central drill are detached from the main shaft.

As a second step, the plugging operation is made.

As shown in FIG. 2, the connecting tray 44 is connected to the flange of the main shaft 31, the plugging shaft 46 is connected to the lower end of the rod 32 by thread and the plugger 45 is fixed to the connecting rod 47, when the flat key 25 is detached and the second threaded rod 22 is not provided at the apparatus, the rod 32 can rotate freely. A process similar to that of the opening operation can be taken to load the plugging unit into the chest 48. It should be noted, before the opening of valve, the rod 32 has to be rotated to assure that the unclosed peripheral portion of the plugger 45 is directed to the upper reaches of the pipe. The first, second and the third nuts 21, 19 and 18 as well as the first and the second threaded rods 20 and 22 are all fixed as shown in FIG. 2 to assure that the direction of the plugger 45 can not be changed by the shock of turbulence resulted from the plugging operation. At the same time when the valve is being opened, the gear 11 is fitted with the gear 8 by the control mechanism 9, which enables the main shaft 31 to move quickly and axially through the worm gear-worm 40 and 39, the gears 41 and 7, the drive shaft 15 and the nut 17, meanwhile the rod 32 drives the plugger 45 to the required plugging location. It should be noted that for the end opening located at the upper reaches, the required plugging location is on the side of the lower reaches, on the contrary, for the end opening located on the lower reaches, it is on the side of the upper reaches.

Afterwards the movement of the main shaft 31 is stopped, then the second threaded rod 22 and the flat key 24 are detached, and the nut 21 is allowed to rotate along the rod 32 until the nut 21 contacts the nut 19. Due to the existence of the nut 19 and the threaded rod 20, the nut 21 cannot further move axially, but can move peripherally, as a result of the further rotation of the nut 21, the rod 32 moves downwards relative to the main shaft 31, extends out from the central hole of the main shaft 31, and drives the plugging shaft 46 to move downwards. At that time, the angle between the plugging shaft 46 and the connecting rod 47 becomes a substantially right one due to the movement of the plugging shaft 46, hence the connecting rod extends outward to press the plugger against tightly the wall of the pipe where the plugging is required. In addition, the plugger plugs the pipe more tightly due to the pressure of the fluid in the pipe.

At that time, the fluid in the pipe flows normally through the upper reaches of the pipe, the by-pass path and the lower reaches of the pipe. However, in the plugged section of the pipe, no fluid passes, therefore, the operations, such as replacement of pipe, pipeline repairing and remodeling of flow circuit, can be performed.

After completion of the required operations, such as replacement, pipeline repairing and remodeling of flow circuit, the plugger is needed to be withdrawn. At that time, the nut 21 is rotated reversibly to form a certain distance between it and the nut 19, then the threaded rods 22 are fixed. The rod 32 is withdrawn upwards by the cooperation of the threaded rods 22 with the nut 21, so that the angle between the connecting rod 47 and the plugging shaft 46 returns to the original place, then the flat key 24 is fitted, and the plugger is withdrawn upwards by the reversed rotation of the main shaft 31. The valve is closed, and the plugger and the feeding means are detached from the chest 48, then the whole plugging unit is detached from the feeding means.

As a third step, the collision-mat feeding operation is made.

As shown in FIG. 3, the connector 2 is threaded to the lower end of the rod 32, then a collision-mat 1 is fixed to the connector 2. Through the steps similar to the above mentioned ones, the collision-mat 1 is loaded into the chest 48, the first, the second and the third nuts 21, 19 and 18 as well as the first threaded rod and the second threaded rod 20 and 22 are fixed as shown in FIG. 3 to assure the cooperated rotation of the main shaft 31 with the rod 32. At the same time when the valve is being opened, the gear 11 is fitted with the gear 8 by the control mechanism 9, thus the rotation of the hydraulic motor is transferred to quickly axially move the main shaft 31 through the worm gear-worm 40 and 39, the gears 41 and 7, the drive shaft 15 and the nut 17, meanwhile the collision-mat 1 is loaded into the four-direction three-way valve. A holding means (not shown) is provided to hold the collision-mat at this location, as the holding means is means of prior art, it will not be further described herein. Afterwards, the flat key 24 and the threaded rods 20 are detached to separate the rod 32 from the main shaft 31, then a clamping tool may be used to clamp the rectangular cross sectional end of the rod 32, the operator may rotate the rod 32 to separate it from the threaded coupling with the connector 2, then the rod 32 is fixedly connected with the main shaft 31, the hydraulic motor is started to withdraw the main shaft 31 together with the rod 32, afterwards the whole feeding means 16 is detached from the chest 48, and the valve is closed, thus the operation is fully completed. In addition, as shown in FIG. 3, there is a back pressure valve in the collision-mat 1, when the main shaft 31 is withdrawn together with the rod 32, a conventional opener is used to open the back pressure valve for a short time to assure that the pressure above and below the collision-mat is equal.

From the description mentioned above, it can be seen that apparatus according to the present invention is capable of completing all the operations of opening, the plugging and the collision-mat feeding and the operations are easy and quick. Meanwhile, the by-pass path is formed within the apparatus itself, no additional by-pass path is needed. The delivery pressure in the pipe is utilized for plugging operation according to the present invention, thus, the higher the pressure is, the better the effect becomes. In addition, the feeding means of this invention is driven by a hydraulic motor, and uses two drive shafts placed on the sides of the main shaft. As a result, compare with the prior art apparatus, the apparatus of this invention is shorter and lighter, which can be used in the workshop and is easy to move.

While the description of the invention has been given with respect to a preferred embodiment, it is not to be constructed in a limited sense. Variations and modification will occur to those skilled in the art. Reference is made to the appended claims for a definition of the invention.

What is claimed is:

1. An apparatus for pipeline construction, comprising
    a constructing mechanism (3) located on a lower part of the apparatus and including a chest (48) and a constructing unit completely receivable within the chest (48) for completing operations;
    a feeding mechanism (16) located on an upper part of the apparatus and to drive the constructing unit to rotate and move axially toward the pipeline; said feeding mechanism (16) includes a main shaft (31), a rod (32), a driving mechanism (13) and a rod feeding mechanism; said main shaft (31) having a central hole extending through said feeding mechanism (16) to drive said constructing unit; said rod (32) is provided within the central hole of the main shaft (31) and selectively moves with respect to said main shaft (31) to drive said constructing unit to approach the pipeline; said driving mechanism (13) transmits power to said main shaft (31) and drives said main shaft (31) to rotate and to move axially; and said rod feeding mechanism drives said rod (32) to move axially; and
    a base (6) including a bottom of said base (6) detachably connected with said constructing mechanism (3) and a top of said base (6) detachably connected to said feeding mechanism (16);
    wherein said rod feeding mechanism comprises a mechanism for controlling said rod (32) to rotate or not to rotate along with said main shaft (31).

2. The apparatus as claimed in claim 1, wherein said rod feeding mechanism further comprises:
    an upper part of said rod (32) which is threaded; and
    a first nut (21) fitted with said threaded part of said rod (32) and to axially move said rod (32).

3. The apparatus as claimed in claim 2, wherein said chest (48) has a by-pass hole (4) connectable with said pipeline outside said chest (48).

4. The apparatus as claimed in claim 1, wherein a lower part of said main shaft (31) extends into said base (6).

5. The apparatus as claimed in claim 4, wherein said chest (48) has a by-pass hole (4) connectable with said pipeline outside said chest (48).

6. The apparatus as claimed in claim 5, wherein in said chest (48), said unit used for completing the operation of opening comprises:
    a barrel cutter (42) fixedly connected to a flange of said main shaft (31) and a central drill (43) fixedly connected to said barrel cutter (42).

7. The apparatus as claimed in claim 1, wherein said chest (48) has a by-pass hole (4) connectable with said pipeline outside said chest (48).

8. An apparatus for pipeline construction, comprising
    a constructing mechanism (3) located on a lower part of the apparatus and including a chest (48) and a constructing unit completely receivable within the chest (48) for completing operations;
    a feeding mechanism (16) located on an upper part of the apparatus and to drive the constructing unit to rotate and move axially toward the pipeline; said feeding mechanism (16) includes a main shaft (31), a rod (32), a driving mechanism (13) and a rod feeding mechanism; said main shaft (31) having a central hole extending through said feeding mechanism (16) to drive said constructing unit; said rod (32) is provided within the central hole of the main shaft (31) and selectively moves with respect to said main shaft (31) to drive said constructing unit to approach the pipeline; said driving mechanism (13) transmits power to said main shaft (31) and drives said main shaft (31) to rotate and to move axially; and said rod feeding mechanism drives said rod (32) to move axially; and
    a base (6) including a bottom of said base (6) detachably connected with said constructing mechanism (3) and a top of said base (6) detachably connected to said feeding mechanism (16)
    wherein said driving mechanism (13) is located on a lower part of said feeding mechanism (16), and said feeding mechanism (16) is connected on said base (6) through said driving mechanism (13), said driving mechanism (13) includes:
        a drive shaft (23) for transmitting power to rotate said main shaft (31);
        a first mechanism for rotating said drive shaft (23);
        a drive shaft (15) for transmitting power to axially move said main shaft (31);
        a second mechanism for rotating said drive shaft (15); and
        a hollow shaft (33) fitted over said main shaft (31) and rotatable with respect to said main shaft (31), said hollow shaft connected with said first mechanism and said second mechanism.

9. The apparatus as claimed in claim 8, wherein said first mechanism for rotating said drive shaft (23) comprises:
    an output shaft of a motor, the extended direction of said output shaft forms a right angle with said main shaft (31);
    a first gear (11) fixed to said output shaft and rotatable along with said output shaft;
    a control mechanism (9) provided on said output shaft;
    a second gear (12) selectively engaged with said first gear (11), said control mechanism (9) engages said second gear (12) with said first gear (11) to rotate said drive shaft (23);
    a worm gear-worm mechanism (35,34), wherein said worm mechanism (34) is fixed together with said second gear (12) and is rotatable along with said second gear (12); said worm gear (35) is fixed to said hollow shaft (33) and rotates said hollow shaft (33);

a third gear (37) fixed to said hollow shaft (33) and rotates along with said hollow shaft (33); and a fourth gear (36) engaged with said third gear (37), which is fixed on said drive shaft (23) and rotates said drive shaft (23).

10. The apparatus as claimed in claim 9, wherein said driving mechanism (13) further comprises:

a fifth gear (28) fixed on said drive shaft (23) and rotatable along with said drive shaft (23); and a sixth gear (29) fixed on said main shaft (31) to rotate said main shaft (31) and in engagement with said fifth gear (28) to transmit rotation of said drive shaft (23) to said main shaft (31), said fifth gear (28) is mounted to slide on said drive shaft (23) to axially move with the axial movement of said main shaft (31), therefore to maintain engagement with said sixth gear (29).

11. The apparatus as claimed in claim 9, wherein said second mechanism for rotating said drive shaft (15) comprises:

a seventh gear (8) selectively engaged with said first gear (11) by said control mechanism (9);

a worm gear-worm mechanism (40,39), wherein said worm mechanism (39) is fixed together with said seventh gear (8) and rotates with said seventh gear (8); said worm gear (40) is rotatably mounted on said hollow shaft (33) and is rotatable about said hollow shaft (33);

a rocker bar (38) is fixedly connected with said worm mechanism (39) and rotates said drive shaft (15), when said first gear (11) is not engaged with said seventh gear (8);

an eighth gear (41) rotatably mounted on said hollow shaft (33) and rotatably fixed together with said worm gear (40); and a ninth gear (7) engaged with said eighth gear (41) and fixed on said drive shaft (15) to rotate said drive shaft (15).

12. The apparatus as claimed in claim 11, wherein said driving mechanism (13) further comprises:

a portion of said drive shaft (15) located in said feeding mechanism (16) is a threaded section;

a nut 17 fixed on said main shaft (31), said threaded section of said drive shaft (15) is fitted with said nut (17), said drive shaft (15) rotation is converted to the axial movement of said main shaft (31).

13. An apparatus for pipeline construction, comprising a constructing mechanism (3) located on a lower part of the apparatus and including a chest (48) and a constructing unit completely receivable within the chest (48) for completing operations;

a feeding mechanism (16) located on an upper part of the apparatus and to drive the constructing unit to rotate and move axially toward the pipeline; said feeding mechanism (16) includes a main shaft (31), a rod (32), a driving mechanism (13) and a rod feeding mechanism; said main shaft (31) having a central hole extending through said feeding mechanism (16) to drive said constructing unit; said rod (32) is provided within the central hole of the main shaft (31) and selectively moves with respect to said main shaft (31) to drive said constructing unit to approach the pipeline; said driving mechanism (13) transmits power to said main shaft (31) and drives said main shaft (31) to rotate and to move axially; and said rod feeding mechanism drives said rod (32) to move axially; and a base (6) including a bottom of said base (6) detachably connected with said constructing mechanism (3) and a top of said base (6) detachably connected to said feeding mechanism (16)

wherein said rod feeding mechanism comprises:

an upper part of said rod (32) which is threaded;

a first nut (21) fitted with said threaded part of said rod (32) and to axially move said rod (32); and a mechanism for controlling said rod (32) to rotate along with said main shaft (31) or not to rotate along with said main shaft (31), said mechanism for controlling comprising:

a key seat extended along said threaded section of said rod (32);

a flat key (24) detachably fitted with said key seat;

a threaded sleeve (25) fitted with said rod (32) by said flat key (24);

a second nut (19) fixedly fitted over said threaded sleeve (25);

a third nut (18) fixedly mounted at an upper end of said main shaft (31); and two first threaded rods (20) for fixedly interconnecting said second nut (19) and third nut (18); said second nut (19) fixedly connected with said first nut (21) by two second threaded rods (22).

14. The apparatus as claimed in claim 13, further comprising a mechanism for defining a peripheral location of said rod (32).

15. The apparatus as claimed in claim 14, wherein said mechanism for defining said peripheral location of said rod (32) is said mechanism for controlling said rod (32) to rotate along with said main shaft (31) or not to rotate along with said main shaft (31).

16. The apparatus as claimed in claim 13, wherein said chest (48) has a by-pass hole (4) connectable with said pipeline outside said chest (48).

17. The apparatus as claimed in claim 14, wherein said chest (48) has a by-pass hole (4) connectable with said pipeline outside said chest (48).

18. The apparatus as claimed in claim 15, wherein said chest (48) has a by-pass hole (4) connectable with said pipeline outside said chest (48).

19. An apparatus for pipeline construction, comprising a constructing mechanism (3) located on a lower part of the apparatus and including a chest (48) and a constructing unit completely receivable within the chest (48) for completing operations;

a feeding mechanism (16) located on an upper part of the apparatus and to drive the constructing unit to rotate and move axially toward the pipeline; said feeding mechanism (16) includes a main shaft (31), a rod (32), a driving mechanism (13) and a rod feeding mechanism; said main shaft (31) having a central hole extending through said feeding mechanism (16) to drive said constructing unit; said rod (32) is provided within the central hole of the main shaft (31) and selectively moves with respect to said main shaft (31) to drive said constructing unit to approach the pipeline; said driving mechanism (13) transmits power to said main shaft (31) and drives said main shaft (31) to rotate and to move axially; and said rod feeding mechanism drives said rod (32) to move axially; and a base (6) including a bottom of said base (6) detachably connected with said constructing mechanism (3) and a top of said base (6) detachably connected to said feeding mechanism (16);

wherein a lower part of said main shaft (31) extends into said base (6);

said chest (48) has a by-pass hole (4) connectable with said pipeline outside said chest (48); and in said chest (48), the unit used for completing the operation of plugging comprises:
- a connecting tray (44) for connecting said flange of said main shaft (31) and having a central hole aligned with said central hole of said main shaft (31);
- a plugger (45);
- a plugging shaft (46) movable through said central hole of said connecting tray (44) and fixed to said lower end of said rod (32) by means of thread; and
- a connecting rod (47), one end fixedly connected to said plugging shaft (46), the other end fitted with said plugger (45), and said connecting rod (47) forms an angle smaller than 90 degrees with the axial direction of said plugging shaft (46), wherein the axial movement of said plugging shaft (46) makes said connecting rod (47) extend outward.

20. The apparatus as claimed in claim 19, wherein said plugger (45) is a peripherally unclosed cylinder with an outer wall, said unclosed peripheral portion of said cylinder is directed to an upper location of the constructed pipeline when said plugger (45) is installed within said chest (48).

21. The apparatus as claimed in claim 20, wherein said outer wall of said plugger is comprised of heat resistant, pressure resistant and oil resistant soft metal.

22. An apparatus for pipeline construction, comprising
a constructing mechanism (3) located on a lower part of the apparatus and including a chest (48) and a constructing unit completely receivable within the chest (48) for completing operations;

a feeding mechanism (16) located on an upper part of the apparatus and to drive the constructing unit to rotate and move axially toward the pipeline; said feeding mechanism (16) includes a main shaft (31), a rod (32), a driving mechanism (13) and a rod feeding mechanism; said main shaft (31) having a central hole extending through said feeding mechanism (16) to drive said constructing unit; said rod (32) is provided within the central hole of the main shaft (31) and selectively moves with respect to said main shaft (31) to drive said constructing unit to approach the pipeline; said driving mechanism (13) transmits power to said main shaft (31) and drives said main shaft (31) to rotate and to move axially; and said rod feeding mechanism drives said rod (32) to move axially; and a base (6) including a bottom of said base (6) detachably connected with said constructing mechanism (3) and a top of said base (6) detachably connected to said feeding mechanism (16);

wherein
- a lower part of said main shaft (31) extends into said base (6);
- said chest (48) has a by-pass hole (4) connectable with said pipeline outside said chest (48); and
- in said chest (48), the unit used for completing collision-mat feeding comprises:
  - a connector (2) slidably mounted within said central hole of said main shaft (31) and fixed to said lower end of said rod (32) by thread; and
  - a collision-mat (1) fixed to said connector (2).

\* \* \* \* \*